United States Patent
Stahl et al.

(10) Patent No.: US 9,539,760 B2
(45) Date of Patent: Jan. 10, 2017

(54) INDEXING WELDING DEVICE FOR TUBE

(71) Applicant: Aisapack Holding SA, Vouvry (CH)

(72) Inventors: Christophe Stahl, Vouvry (CH); Jean-Claude Schwager, Collombey (CH); Didier Ferrin, Bouveret (CH)

(73) Assignee: Aisapack Holding S.A., Vouvry (CH)

( * ) Notice: Subject to any disclaimer, the term of this patent is extended or adjusted under 35 U.S.C. 154(b) by 0 days.

(21) Appl. No.: 14/902,600

(22) PCT Filed: Jun. 25, 2014

(86) PCT No.: PCT/IB2014/062593
§ 371 (c)(1),
(2) Date: Jan. 4, 2016

(87) PCT Pub. No.: WO2015/001453
PCT Pub. Date: Jan. 8, 2015

(65) Prior Publication Data
US 2016/0176106 A1    Jun. 23, 2016

(30) Foreign Application Priority Data
Jul. 3, 2013  (EP) .................................... 13174868

(51) Int. Cl.
*B65G 47/82* (2006.01)
*B29C 65/78* (2006.01)
(Continued)

(52) U.S. Cl.
CPC .......... *B29C 65/7885* (2013.01); *B29C 31/002* (2013.01); *B29C 66/5344* (2013.01);
(Continued)

(58) Field of Classification Search
CPC ....... B65G 47/80; B65G 47/82; B65G 47/846; B65G 2812/14
(Continued)

(56) References Cited

U.S. PATENT DOCUMENTS 3,764,425 A * 10/1973 Neff et al. ............. B29D 23/20
                                                          156/208
4,030,616 A *  6/1977 Vetten ....................... B31B 1/74
                                                          198/468.6

(Continued)

FOREIGN PATENT DOCUMENTS

| FR | 2367601 | 5/1978 |
| WO | WO2004026567 | 4/2004 |
| WO | WO2007141711 | 12/2007 |

OTHER PUBLICATIONS

Chinese Office Action of the Chinese Counterpart Application wiht the Serial No. 201480038119.6, issued Sep. 26, 2016 and English Translation thereof.

*Primary Examiner* — James R Bidwell
(74) *Attorney, Agent, or Firm* — Andre Roland S.A.; Nikolaus Schibli

(57) ABSTRACT

Rotary indexing device for manufacturing packaging tubes, comprising an indexing turntable (3) mounted in a rotary manner about an axis (9), and mandrels (4) and respective supports (14) secured to said turntable (3) and disposed radially with respect to said axis (9); radial actuating means (10, 11) for moving the mandrels (4) in a direction perpendicular to said axis (9) and linear guide means (13) for moving the mandrels (4) in a direction perpendicular to said axis (9); characterized in that the mandrels and respective supports (14), the radial actuating means (10, 11) and the linear guide means (13) are disposed in a direction parallel to said axis (9).

13 Claims, 4 Drawing Sheets

(51) Int. Cl.
*B29C 31/00* (2006.01)
*B29C 65/00* (2006.01)
B29D 23/20 (2006.01)
B29L 23/00 (2006.01)

(52) U.S. Cl.
CPC ...... *B29C 65/7882* (2013.01); *B29C 66/8225* (2013.01); *B29C 66/8322* (2013.01); *B29D 23/20* (2013.01); *B29L 2023/00* (2013.01)

(58) Field of Classification Search
USPC .................. 198/482.1, 483.1, 476.1, 477.1
See application file for complete search history.

(56) References Cited

U.S. PATENT DOCUMENTS

| | | | |
|---|---|---|---|
| 4,152,566 A | | 5/1979 | Magerle |
| 4,238,267 A | * | 12/1980 | Konstantin ........... B29C 61/025 |
| | | | 156/215 |
| 4,310,366 A | * | 1/1982 | Van Manen ............ B29C 57/00 |
| | | | 156/244.13 |
| 4,915,210 A | * | 4/1990 | Jowitt .................... C25D 13/22 |
| | | | 198/476.1 |
| 6,221,189 B1 | | 4/2001 | Kieras et al. |
| 7,448,187 B2 | | 11/2008 | Keller |

* cited by examiner

INDEXING WELDING DEVICE FOR TUBE

CROSS-REFERENCE TO RELATED APPLICATIONS

This application is the U.S. national stage of International Application No. PCT/IB2014/062593, filed Jun. 25, 2014, which designated the U.S. and claims foreign priority to the European patent application No. 13174868.3, filed Jul. 3, 2013, the entire contents of each of which are hereby incorporated by reference.

FIELD OF THE INVENTION

The invention relates to the field of devices for the manufacture of flexible packaging tubes for liquid or viscous products, and more particularly the field of packaging tubes manufactured by welding. These tubes comprise a tube body, a tube shoulder, possibly a seal closing off the opening in the shoulder and a cap.

STATE OF THE ART

Flexible tubes generally have two separate parts, namely a skirt or flexible cylindrical body connected to a shoulder comprising a nozzle, possibly a seal welded onto the neck, and a cap. The skirt of the tube is obtained either by extruding a tubular body, or by welding a multilayer sheet.

Rotary indexing devices which make the operations of assembling the skirt, the shoulder, the seal and the cap are known.

Rotary indexing devices for assembling tubes operate with intermittent movements. The rotary part of the device bears mandrels which move in succession from one workstation to another. The mandrels carry the packaging while it is being manufactured. The indexing device allows assembly operations to be carried out when the rotary device is stopped, which is advantageous for the accuracy and simplicity of the device. The cycle of the rotary indexing device is divided into a rotation time and a stopped time. The rotation time is also called the indexing time. When the turntable is stopped assembly unit operations then start with the following movements:
  relative approach movement between the mandrels and the workstations;
  mandrel at the workstation;
  relative withdrawal movement between the mandrels and the workstations.

While rotation of the turntable is stopped assembly unit operations are performed, such as for example:
  1. fitting the shoulder of the tube onto the mandrel
  2. fitting the skirt of the tube onto the mandrel
  3. accurate positioning of the skirt on the mandrel
  4. heating of the zone which has to be welded
  5. welding of the skirt onto the shoulder
  6. sealing
  7. capping
  8. ejection Reduction in working time is restricted by the time of the unit operations on which the quality of the manufactured packaging depends. The working time is fixed by the longest unit operation, such as for example the welding operation. Beyond a certain limit this working time becomes incompressible, because reducing it would have an adverse effect on the intrinsic properties of the packaging. Optimization of the indexing time which has no effect on quality of assembly must therefore be the determining factor when it is desired to achieve high production rates.

Patent application WO 2004/026567 A1 discloses a rotary indexing device with mandrels located in a plane parallel to the axis of the indexing turntable. Optimizing indexing time in this type of device is limited by the inertia of the turntable, the diameter of which increases rapidly with the number of mandrels in parallel. In this device the approach and withdrawal movements are performed by the workstations. This leads to the disadvantage that each workstation is provided with a specific device for making the approach movement.

U.S. Pat. No. 6,221,189 describes a device comprising an indexing turntable with the mandrels arranged radially. In this device the workstations carry out the radial approach and withdrawal movements. As in patent application WO 2004/026567 A1 the device disclosed by Kieras has the disadvantage that each workstation requires a specific device for making the approach movement.

Patent application WO 2007/141711 by the applicant describes a device whereby the disadvantages of the device disclosed in U.S. Pat. No. 6,221,189 can be overcome. This device (see FIGS. 2 and 3) provides a radial arrangement of mandrels 4 on turntable 3. The positions of the workstations are fixed. Mandrels 4 perform radial approach and withdrawal movement 15. The manner of construction of the device described in this prior art is particularly useful because it allows all mandrels 4 to act simultaneously in approach and withdrawal movement 15. The device comprises a frame 2 to which is connected a turntable 3 which rotates about an axis 9 through a rotary guide member 12. The turntable drives mandrels 4. Mandrels 4 move radially with respect to turntable 3 to perform approach and withdrawal movement 15. A linear guide member 13 connects turntable 3 to mandrels 4. Radial approach and withdrawal movement 15 of mandrels 4 is brought about by a rotary member with a cam 5 and a spring 6 or by a rotary member 10 and a connecting rod 11. Rotary member 5, 10 is connected to the turntable through a rotary guide member 12. However the device described in application WO 2007/141711 provides an embodiment according to which linear guide function 13 and mandrel operation functions 5, 10, 11 are arranged radially in series on the axis 9 of turntable 3. This mandrel construction results in increasing the virtual diameter 8 of the circle formed by the ends of the mandrels and therefore results in significant inertia of the device when rotating (moment of inertia). This increase in inertia opposes a reduction in indexing time.

The device in the prior art described in patent application WO 2007/141711 is illustrated conceptually in FIG. 1. In this concept its construction is based on a radial arrangement of the following members in series:
  linear guide member 13 for mandrel 4
  actuating member 5, 10 for mandrel 4 so that it performs approach and withdrawal movement 15
  mandrel 4 and its support 14

The device in application WO 2007/141711 makes it possible to place all the mandrels in radial movement as a result of a single action, but has the disadvantage of having a large moment of inertia, which during the stages in which turntable 3 is accelerated and decelerated gives rise to significant changes in torque on the axis of the turntable and in production rates.

The Problem that has to be Solved

The disadvantages of the device provided in patent application WO 2007/141711 need to be overcome.

DEFINITION OF THE TERMS USED IN THE DESCRIPTION OF THE INVENTION

1: Rotary indexing device for the manufacture of tubes by welding
2: Frame
3: Indexing turntable
4: Mandrel
5: Rotary actuating member with cam
6: Spring
7: Virtual circle formed by the bases of the mandrels
8: Virtual circle formed by the ends of the mandrels
9: Axis of rotation of the turntable
10: Rotary actuating member
11: Connecting rod
12: Rotary guide member
13: Linear guide member
14: Mandrel support
15: Approach and withdrawal movement
16: Mandrel length
17: Mandrel diameter
18: Mandrel width at the base

GENERAL DESCRIPTION OF THE INVENTION

The invention relates to an indexing assembly device for packaging tubes. This device makes it possible to carry out the following successive operations required for the manufacture of a packaging tube:
  a) fitting the shoulder of the tube onto the mandrel
  b) fitting the skirt of the tube onto the mandrel
  c) accurate positioning of the skirt on the mandrel
  d) heating the zone which has to be welded
  e) welding the skirt onto the shoulder
  f) sealing
  g) capping
  h) ejection The invention relates to a particularly advantageous device for reducing indexing time and achieving high production rates while maintaining a radial mode of action for the mandrels as described in application WO 2007/141711.

In this invention the inertia of the device is lower than in similar devices in the state of the art. As a result indexing time can be reduced, and this offers the possibility of increasing the production rate.

Stated in other words, the invention makes it possible to increase production rate without reducing welding times.

It should also be pointed out that this increase in rate has no effect on the quality of the packaging produced, its performance, or its appearance.

The invention relates in particular to a rotary indexing device for the manufacture of packaging tubes comprising a turntable rotatably mounted about an axis. The device according to the invention also comprises the following members: mandrels and respective supports made of one piece with said turntable and arranged radially in relation to said axis,
  radial actuating means to move the mandrels in a direction perpendicular to said axis
  linear guide means to move the mandrels in a direction perpendicular to said axis.

The device according to the invention is characterized by the fact that the mandrels and their respective supports, the radial actuating means and the linear guide means are located along a straight line parallel to said axis.

It should be emphasized that in the prior art, in particular WO 2007/141711, the mandrels and their respective supports, the radial actuating means and the linear actuating means are arranged along a straight line perpendicular to said axis.

By opting for a parallel arrangement of the three aforesaid members the moment of inertia of the whole is considerably reduced in accordance with the formula $I=\Sigma m_i d_i^2$, in which I represents the moment of inertia, m the mass of each member and d the distance of each member from the axis of rotation.

Thus in this invention radial dimensions are only governed by the geometry of the mandrels and the number of stations.

The invention makes it possible to increase the number of mandrels in parallel per station without increasing the radial dimensions.

In accordance with one embodiment of the invention said axis is located in a vertical direction, that is to say in a direction substantially parallel to the direction of the force of gravity. This embodiment is advantageous for a device which is placed on a table. It makes it possible to have all the stations at the same height.

According to another embodiment of the invention said axis is located in a horizontal direction, that is in a direction substantially perpendicular to the direction of the force of gravity. This embodiment is advantageous with regard to visual supervision of the device. Access to workstations is more direct.

According to another embodiment of the invention the base of each mandrel is in contact with the bases of the mandrels adjacent to it. By mandrel "base" is meant the part of the mandrel which is in contact with the turntable.

According to another embodiment the invention makes it possible to be independent of the diameter of the tube which has to be manufactured and to decrease the moment of inertia still further. This variant comprises profiling the geometry of the mandrels such that the cross-section of the extremity bearing the shoulder of the tube is circular, whereas the opposite extremity of the mandrel attached to the mandrel holder has minimal circumferential dimensions along the axis of rotation of the turntable. This approach generally leads to mandrel cross-sections of the type which are "oval at one end and circular at the other".

In accordance with one embodiment mandrels 4 are located in a plane perpendicular to the axis of rotation of the turntable.

According to another embodiment of the invention the virtual surface formed by the axes of the mandrels is a cylinder centered on the axis of the turntable.

According to another embodiment of the invention the virtual surface formed by the axes of the mandrels is a cone centered on the axis of the turntable.

BRIEF DESCRIPTION OF THE FIGURES

FIG. 1 illustrates the devices in the prior art in a conceptual manner.

FIG. 2 illustrates a device in patent application WO 2007/141711 along a cross-sectional plane comprising the axis of rotation of the turntable.

FIG. 3 illustrates a device in application WO 2007/141711 in a view perpendicular to the axis of rotation of the turntable.

FIG. 5 illustrates an embodiment of the device according to the invention observed in a direction along the axis of rotation of the turntable.

FIG. 6 illustrates the device in FIG. 5 seen in a cross-sectional plane comprising the axis of rotation of the turntable.

DETAILED DESCRIPTION OF THE INVENTION

Figure 1:
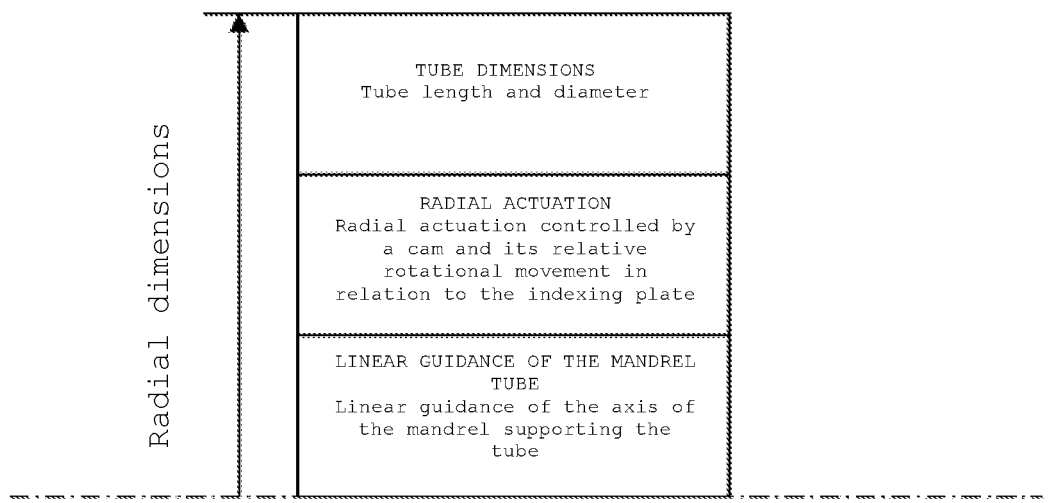
FIGS. 1 to 3 illustrate the devices in the prior art.
Figure 2:
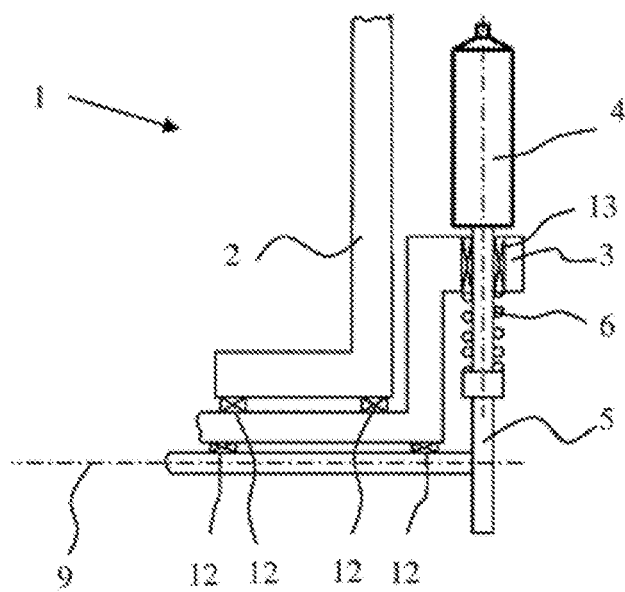
Figures 3, 4:
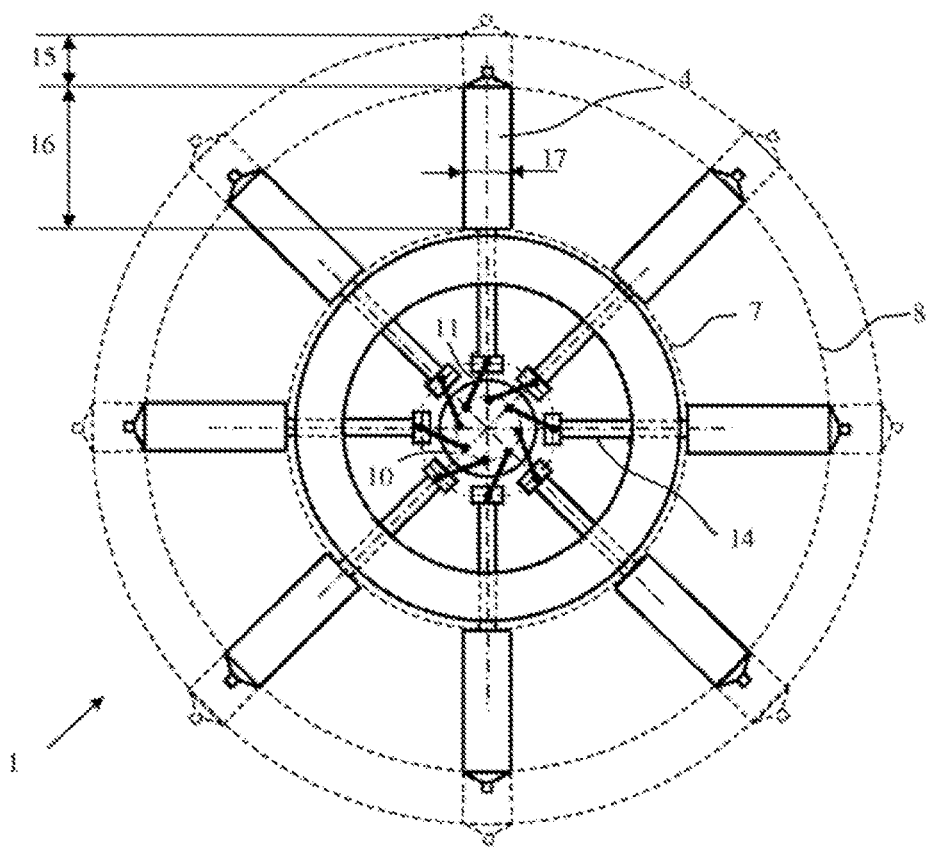
FIG. 4 illustrates the concept of the device according to the invention.

According to the concept of the invention illustrated in FIG. 4 the device is based on a radial arrangement of the following members in parallel:

- linear guide member 13 for mandrel 4
- the member actuating mandrel 4 to perform approach and withdrawal movement 15
- mandrel 4 and its support 14

The configuration described in FIG. 4 is particularly advantageous because the moment of inertia of the rotary assembly can be substantially reduced and as a consequence production rates can be increased through reducing indexing times.

The invention described in FIG. 4 makes it possible to bring axis of rotation 9 closer to the center of inertia of mandrels 4, thus significantly reducing the torque on the axis of the turntable during acceleration and deceleration stages. The invention makes possible a significant increase in the level of acceleration and deceleration of the turntable without creating an excessively large torque on the drive shaft. The invention can therefore be used to reduce the power of the drive motor or to increase rate with an identical motor.

During the acceleration and deceleration stages of the indexing cycle each mandrel 4 produces a torque which is proportional to the square of the distance between the center of inertia of said mandrels and axis of rotation 9. It is therefore very useful to be able to bring the mandrels as close as possible to axis of rotation 9.

Figure 5:
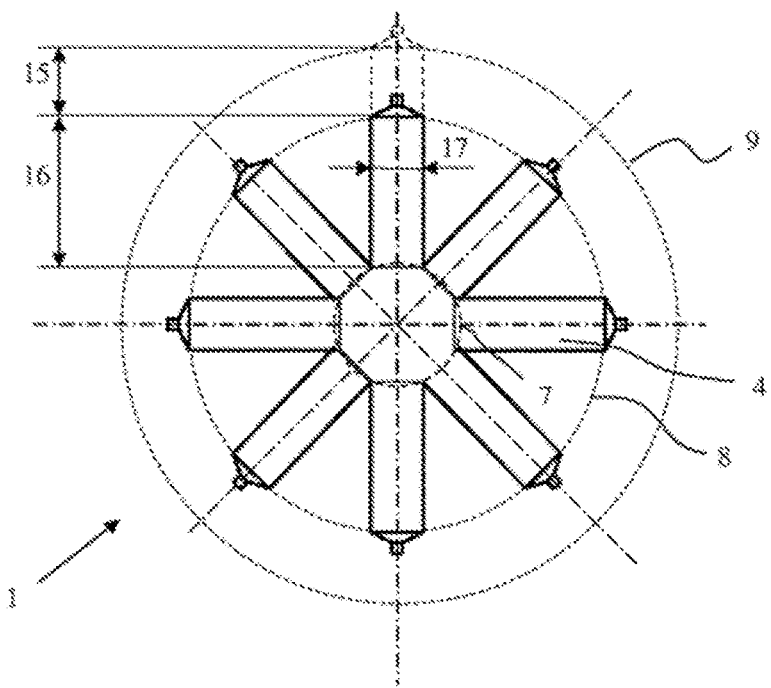
FIGS. 5 and 6 illustrate an embodiment of the invention.

FIG. 5 illustrates the optimum dimensions of the device according to the invention fitted with 8 mandrels 4 of circular cross-section. Indexing device 1 is illustrated in a direction along the axis of rotation 9 of the turntable causing mandrels 4 to rotate. As FIG. 5 shows, device is extremely compact because it corresponds to the minimum theoretical dimensions of 8 mandrels positioned about an axis of rotation. The dimensions of the system depend on the diameter 17 of mandrels 4 and their number. In practice a very small distance between the bases of the mandrels is preferably maintained to avoid collisions during movements. The angular distance between two mandrels corresponds to the indexing angle. At the end of each indexing cycle mandrels 4 move radially over movement 15 toward the workstations. The radial approach and withdrawal movement 15 is carried out simultaneously and identically for all the mandrels.

Figure 6:
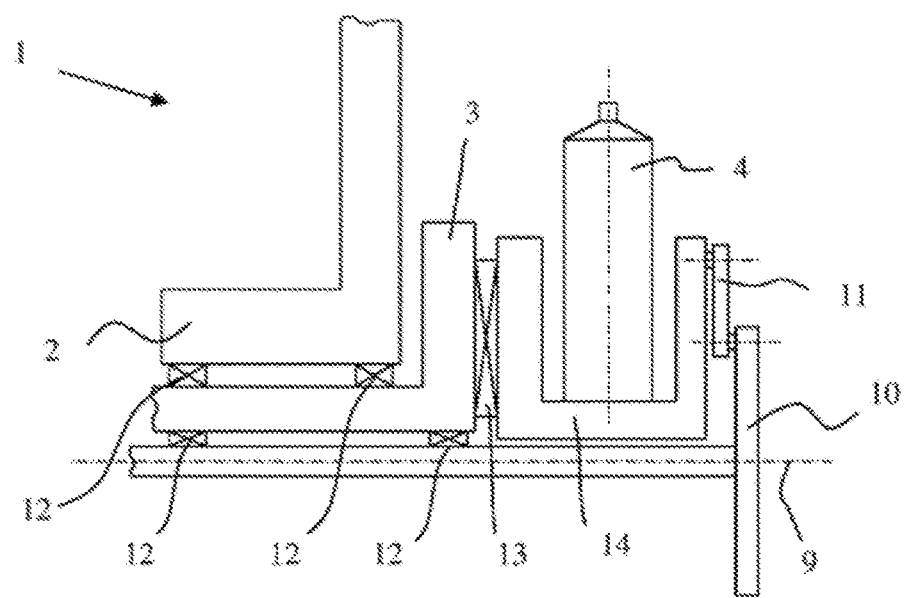

FIG. 6 illustrates device 1 perpendicularly to axis of rotation 9. Frame 2 supports a turntable 3 which rotates about axis 9. Rotary guide members 12 connect turntable 3 to the frame. Rotary guide members 12 may be journal bearings or preferably roller bearings. Because of their small dimensions needle rollers may be advantageous. Mandrels 4 are attached to turntable 3 through a support 14 and a radial linear guide 13. Radial guide 13 makes it possible to make approach and withdrawal movement 15 to and from the workstations. A rotary member 10 which drives said approach and withdrawal movement through a connecting rod 11 is mounted on axis 9. Rotary member 10, radial guide 13 and mandrel 4 and its support 14 are positioned in parallel along axis of rotation 9, which has the effect of reducing the radial dimensions of virtual circle 8 passing through the ends of mandrels 4. In accordance with the invention the radial dimensions may be reduced by a factor of 1.5 to 4 in comparison with devices in the prior art.

Figure 7:
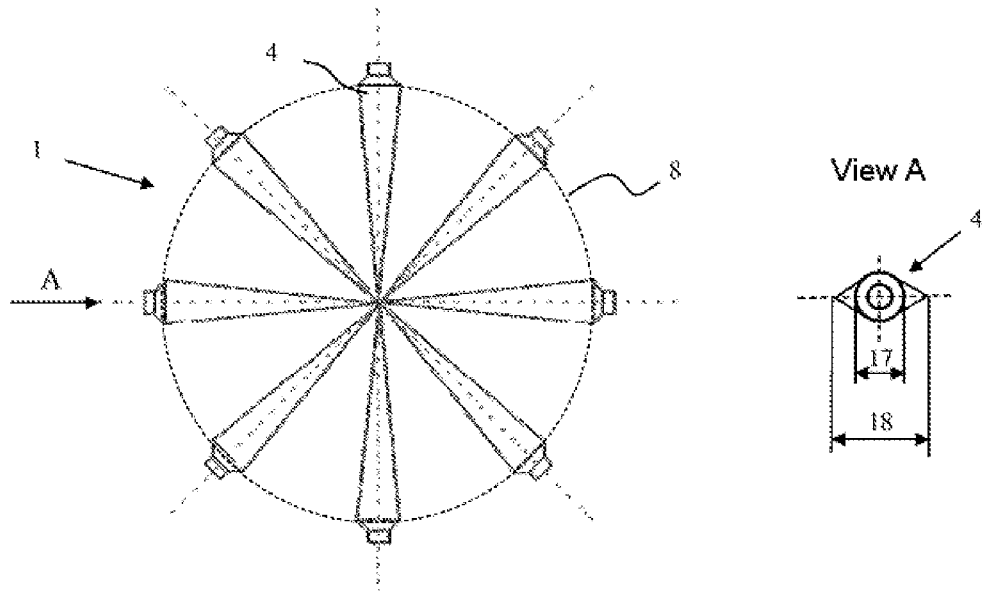
FIG. 7 illustrates a variant embodiment comprising using mandrels having non-cylindrical geometry.
Figure 8:
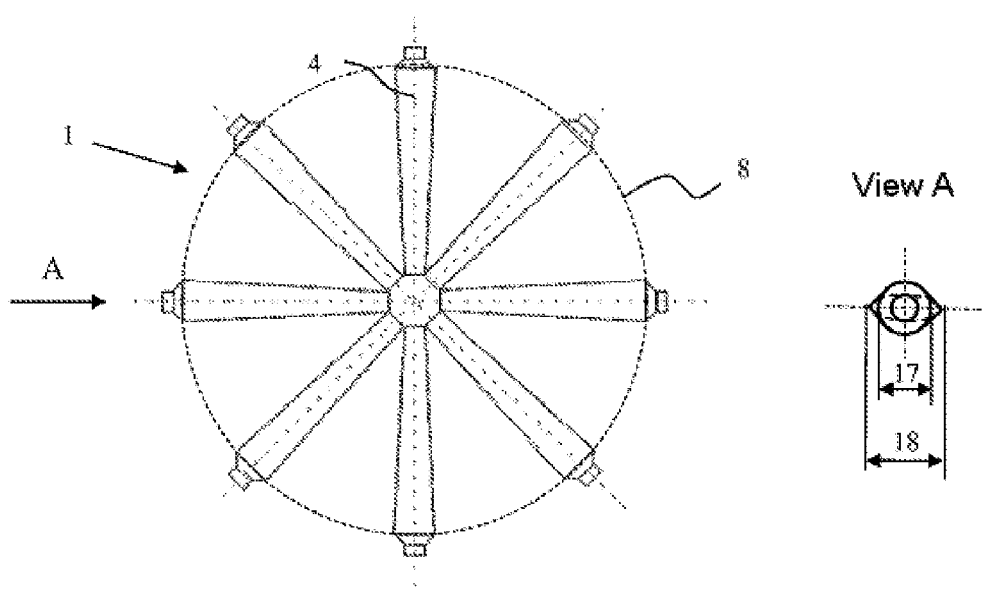
FIG. 8 illustrates an embodiment of the variant of the invention described in FIG. 7.

FIGS. 7 and 8 illustrate a variant embodiment of the invention.

FIG. 7 illustrates a conceptual variant embodiment of the invention which comprises optimizing the geometry of mandrels 4 to make device 1 even more compact. FIG. 7 shows a profiled geometry of mandrel 4 having one end of cross-section matching that of the shoulder of the tube, for example circular or oval, and the other extremity which is referred to as being "flat" so that the so-called "flat" extremity generates small circumferential dimensions and the axis of gravity of the mandrels may be brought closer to axis of rotation 9. View A in FIG. 7 illustrates mandrel 4 along the axis of said mandrel. FIG. 7 illustrates conceptual dimensions which cannot be achieved because the ends of mandrels 4 correspond to axis of rotation 9. On the basis of the concept illustrated in FIG. 7 the cross-sections of the mandrels vary along the axis of said mandrels, but the circumference remains constant.

FIG. 8 illustrates an embodiment of the invention according to the concept illustrated in FIG. 7. Mandrels 4 have a variable cross-section with a constant circumference, which makes it possible to reduce the dimensions and as a consequence the inertia of the device. The variant of the invention illustrated in FIG. 8 is particularly advantageous when the diameter of mandrels 4 is large.

The invention is not restricted to the manufacture of packaging tubes of cylindrical cross-section. The geometry of the tubes produced is for example of oval or square cross-section. The geometry of mandrels 4 must be adjusted to the geometry of the tubes which have to be manufactured. In particular the geometry of the free ends of mandrels 4 must match the geometry of the shoulder of the tube. Thus in order to produce an oval tube the free geometry of mandrel 4 will be oval.

The figures describing the invention show mandrels 4 in a plane perpendicular to the axis 9 of turntable 3.

One variant of the invention comprises arranging mandrels 4 on a cylindrical surface centered on axis of rotation 9 of turntable 3.

Another variant of the invention comprises arranging mandrels 4 on a conical surface centered on axis of rotation 9 of turntable 3.

In accordance with one embodiment of the invention there is minimum spacing between the workstations.

The invention is particularly advantageous for increasing production rates. With a single-mandrel device at 8 stations constructed in accordance with the descriptions of the prior art a production rate of 60 tubes/min is achieved:

production rate: 60 tubes/min
cycle time of the rotary indexing device: 1000 ms
working time: 400 ms
indexing time: 600 ms With a single mandrel device at 8 stations constructed in accordance with the invention the production rate is doubled, namely:

production rate: 120 tubes/min
cycle time of the rotary indexing device: 500 ms
working time: 400 ms indexing time: 100 ms The working time is the same, but the indexing time is divided by 6.

The invention claimed is:

1. A rotary indexing device for the manufacture of packaging tubes comprising:
   an indexing turntable mounted to rotate about an axis;
   mandrels and corresponding supports which are made of one piece with the turntable and are arranged radially in relation to the axis; and
   radial actuating devices to move corresponding mandrels in a direction perpendicular to the axis and a linear guide to ensure that the mandrels move in a direction perpendicular to the axis,
   wherein each radial actuating device, the corresponding mandrel and the corresponding support are arranged in parallel and overlap each other when viewed in a direction parallel to the axis.

2. The device as claimed in claim 1, wherein the axis is arranged in a vertical direction.

3. The device as claimed in claim 1, wherein the axis is arranged in a horizontal direction.

4. The device as claimed in claim 1, wherein a theoretical base of each mandrel is in contact with theoretical bases of the neighboring mandrels.

5. The device as claimed in claim 1, wherein a base of each mandrel has a cross-section that is smaller than a cross-section of the mandrel toward its free extremity.

6. The device as claimed in claim 5, wherein the cross-section of the base is oval in shape.

7. The device as claimed in claim 5, wherein the cross-section of the base is rectangular in shape.

8. The device as claimed in claim 1, wherein a cross-section of the mandrel toward its free extremity forms a disk.

9. The device as claimed in claim 1, wherein a cross-section of the mandrel varies over its length.

10. The device as claimed in claim 1, further comprising: a rotary guide device.

11. The device as claimed in claim 1, wherein the corresponding support of each mandrel has a shape such that the corresponding radial actuating device is arranged next to a side wall of the corresponding mandrel when viewed in a direction parallel to the axis.

12. The device as claimed in claim 1, wherein a linear motion axis of the radial actuating device is offset from a rotational symmetric axis of the mandrel.

13. The device as claimed in claim 1, wherein a theoretical base of a mandrel is in contact with theoretical bases of each neighboring mandrels when the radial actuating devices have not moved corresponding mandrels in the direction perpendicular to the axis.

* * * * *